(12) United States Patent
Yamada et al.

(10) Patent No.: US 10,263,401 B2
(45) Date of Patent: Apr. 16, 2019

(54) PRESSURE TANK, GAS INSULATED SWITCHGEAR USING SAME, AND PRESSURE TANK MANUFACTURING METHOD

(71) Applicant: MITSUBISHI ELECTRIC CORPORATION, Chiyoda-ku, Tokyo (JP)

(72) Inventors: Shintaro Yamada, Tokyo (JP); Yukinobu Kamei, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/539,389

(22) PCT Filed: Dec. 1, 2015

(86) PCT No.: PCT/JP2015/083757
§ 371 (c)(1),
(2) Date: Jun. 23, 2017

(87) PCT Pub. No.: WO2016/163051
PCT Pub. Date: Oct. 13, 2016

(65) Prior Publication Data
US 2018/0013268 A1    Jan. 11, 2018

(30) Foreign Application Priority Data

Apr. 8, 2015 (WO) .................. PCT/JP2015/060915

(51) Int. Cl.
*H01H 33/56* (2006.01)
*H02B 13/045* (2006.01)
(Continued)

(52) U.S. Cl.
CPC ......... *H02B 13/045* (2013.01); *B23K 9/0256* (2013.01); *B23K 9/167* (2013.01);
(Continued)

(58) Field of Classification Search
CPC .... B23K 9/007; B23K 9/0043; B23K 9/0203; H02B 13/02; F24H 1/20; F24H 9/00
See application file for complete search history.

(56) References Cited

U.S. PATENT DOCUMENTS

| 5,448,716 A | 9/1995 | Hardell, Jr. et al. |
| 2009/0194040 A1 | 8/2009 | Somajini |

FOREIGN PATENT DOCUMENTS

| CN | 101449112 B | 6/2011 |
| JP | 62-224008 A | 10/1987 |

(Continued)

OTHER PUBLICATIONS

International Search Report (PCT/ISA/210) dated Feb. 23, 2016, by the Japanese Patent Office as the International Searching Authority for International Application No. PCT/JP2015/083757.
(Continued)

*Primary Examiner* — Daniel J Wiley
(74) *Attorney, Agent, or Firm* — Buchanan, Ingersoll & Rooney PC (57) ABSTRACT

To obtain a pressure tank that achieves a high manufacturing efficiency and does not hamper storage of an open/close portion such as a vacuum valve in a pressure tank. A pressure tank of the present invention includes: a tank body having at least one penetrating slit-shaped mortise and having a space formed inside the tank body; a reinforcing member having a tenon portion formed at an end thereof so as to be directed in one direction, and having an electric field relaxation portion on a side opposite to the tenon portion, the reinforcing member being attached to an inner wall surface of the
(Continued)

tank body with the tenon portion inserted into the mortise; and a welding portion sealing and fixing the mortise and the tenon portion with no gap therebetween, the welding portion being formed by melting an end of the tenon portion from outside of the tank body.

13 Claims, 11 Drawing Sheets

(51) Int. Cl.
*H02B 3/00* (2006.01)
*H02B 13/025* (2006.01)
*B23K 9/167* (2006.01)
*F17C 1/08* (2006.01)
*B23K 9/025* (2006.01)
*B23K 9/23* (2006.01)
*B23K 101/00* (2006.01)
*B23K 101/04* (2006.01)
*B23K 101/12* (2006.01)
*B23K 103/04* (2006.01)
*B23K 103/10* (2006.01)
*H01H 33/666* (2006.01)

(52) U.S. Cl.
CPC .................. *B23K 9/23* (2013.01); *F17C 1/08* (2013.01); *H01H 33/56* (2013.01); *H02B 3/00* (2013.01); *H02B 13/025* (2013.01); *B23K 2101/006* (2018.08); *B23K 2101/045* (2018.08); *B23K 2101/12* (2018.08); *B23K 2103/05* (2018.08); *B23K 2103/10* (2018.08); *H01H 2033/6665* (2013.01)

(56) References Cited

FOREIGN PATENT DOCUMENTS

| JP | 64-034805 U | 3/1989 |
| JP | 05-006825 A | 1/1993 |
| JP | 06-231097 A | 8/1994 |
| JP | 2002-260501 A | 9/2002 |
| JP | 2009-535600 A | 10/2009 |
| JP | 2012-039872 A | 2/2012 |

OTHER PUBLICATIONS

Written Opinion (PCT/ISA/237) dated Feb. 23, 2016, by the Japanese Patent Office as the International Searching Authority for International Application No. PCT/JP2015/083757.

Office Action dated Oct. 18, 2016, by the Japanese Patent Office for Application No. 2016-524162.

Office Action dated Aug. 2, 2018, by the Chinese Patent Office in corresponding Chinese Patent Application No. 201580078186.5 and English translation of the Office Action. (30 pages).

Extended European Search Report dated Dec. 6, 2018 by the European Patent Office in corresponding European Patent Application No. 15888542.6.

PRESSURE TANK, GAS INSULATED SWITCHGEAR USING SAME, AND PRESSURE TANK MANUFACTURING METHOD

TECHNICAL FIELD

The present invention relates to a pressure tank, a gas insulated switchgear using the same, and a pressure tank manufacturing method.

BACKGROUND ART

A gas insulated switchgear has a structure in which an open/close portion composed of a vacuum valve and the like is fixed in a pressure tank filled with a gas that is excellent in insulation property and arc-distinguishing capability. In general, this pressure tank is filled with the gas at a pressure of about 0.03 to 0.6 MPa, and as compared to a conventional air insulated switchgear, excellent insulation property and excellent arc-distinguishing capability are obtained and significant downsizing is achieved. In addition, since the open/close portion is sealed in the pressure tank, the open/close portion is not subject to contamination, and thus high reliability and safety are obtained.

In this gas insulated switchgear, it is necessary to stably retain the gas in the pressure tank and prevent the pressure tank from being broken due to stress concentration on a corner portion of the pressure tank by the internal pressure of the filling gas. In order to adapt to such a purpose, the pressure tank is configured such that wall surface materials formed from metal plates are combined, connection parts of the wall surface materials are connected by welding, and further, a rod-like member or a bent plate material is welded to the inner wall surface of the pressure tank, for reinforcement (for example, Patent Document 1 and Patent Document 2).

In general, as a structure for enhancing the strength of a container such as a tank, there is known a structure in which a plate-shaped reinforcing member is formed between the opposed ones of the wall surface materials composing the tank and thus a wall is formed in the tank (for example, Patent Document 3). For joining between the plate-shaped reinforcing member and the wall surface materials, protruding tenon portions are formed on two opposed sides of the plate-shaped reinforcing member, and the opposed wall surface materials have slit-like mortises into which the tenon portions are inserted and which penetrate through the wall surface materials. From inside of the tank, the tenon portions formed on the two sides of the reinforcing member are inserted and fitted into the mortises of the two opposed wall surface materials, and the tenon portions and the mortises are welded from outside of the tank, whereby the plate-shaped reinforcing member can be fixed between the opposed wall surface materials in the tank.

CITATION LIST

Patent Document

Patent Document 1: Japanese Laid-Open Patent Publication No. 5-6825
Patent Document 2: Japanese Laid-Open Patent Publication No. 6-231097
Patent Document 3: Japanese Translation of PCT International Application Publication No. 2009-535600

SUMMARY OF THE INVENTION

Problems to be Solved by the Invention

However, in the case where the wall surface materials of the tank body forming the pressure tank are reinforced by the rod-like member or the like from inside of the pressure tank, a space for performing the work is narrow, and the work such as welding is performed in the limited space, thus causing a problem that the work efficiency is deteriorated. Further, spatter (weld spatter) occurs around the part where the welding has been performed. Therefore, it is necessary to clean the spatter, and since the structure members are distorted due to heat by welding, it is also necessary to perform work for removing the distortion.

In addition, in the case where the plate-shaped reinforcing member is formed between the opposed wall surface materials, an area for mounting the open/close portion and the like in the tank body is reduced, thus causing a problem that it is difficult to configure the gas insulated switchgear in a small size.

The present invention has been made to solve the above problems, and an object of the present invention is to obtain a pressure tank, a gas insulated switchgear using the same, and a pressure tank manufacturing method, which enable easy manufacturing and enable downsizing.

Solution to the Problems

A pressure tank of the present invention includes: a tank body having at least one penetrating mortise and having a space formed inside the tank body; a reinforcing member having a tenon portion formed at an end thereof so as to be directed in one direction, and having an electric field relaxation portion on a side opposite to the tenon portion, the reinforcing member being attached inside the tank body with the tenon portion inserted into the mortise; and a welding portion sealing and fixing the mortise and the tenon portion with no gap therebetween, the welding portion being formed by melting an end of the tenon portion from outside of a wall surface material.

Effect of the Invention

In the pressure tank of the present invention, the tenon portion, of the reinforcing member, protruding in one direction is inserted into the mortise formed in the wall surface material of the tank body forming the pressure tank, and is fixed by being welded from outside of the tank body. Thus, it becomes possible to obtain a pressure tank which enables easy manufacturing and enables downsizing of a switchgear.

DESCRIPTION OF EMBODIMENTS

In the descriptions of the embodiments and the drawings, parts denoted by the same reference characters indicate identical or corresponding parts.

Embodiment 1

<Structure of Gas Insulated Switchgear>

Figure 1:
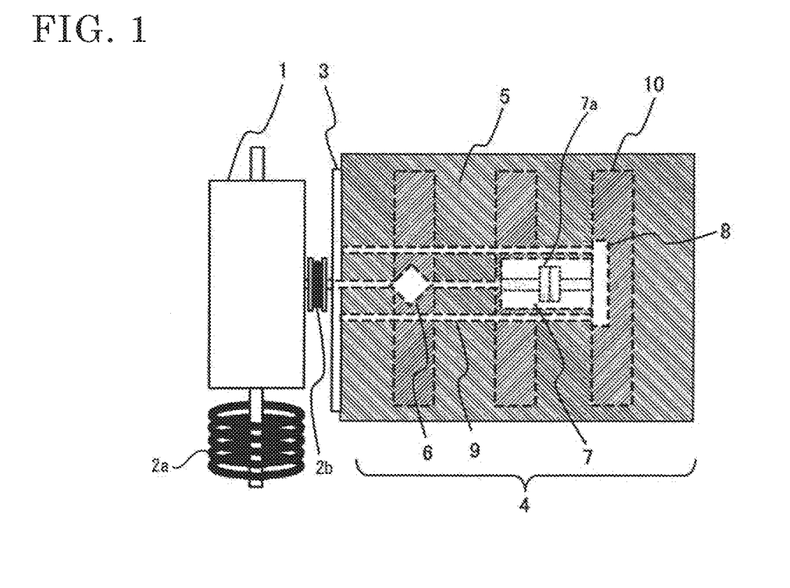
FIG. 1 is a schematic view showing the configuration of a gas insulated switchgear according to embodiment 1 of the present invention.

FIG. 1 schematically shows the configuration of a gas insulated switchgear, and a part indicated by a broken line shows an open/close portion stored inside the pressure tank 4. The gas insulated switchgear includes an insulation rod 6, a vacuum valve 7, a fixed terminal 8, and an insulation holder 9, and the open/close portion stored in the pressure tank 4 is connected, to an operation spring 2a and a spring operation device 1 for causing the open/close portion to operate, via a contact pressure spring 2b for applying a contact force to an electrode 7a in the vacuum valve 7. The open/close portion composed of the vacuum valve 7 and the like is separated from the spring operation device 1 via a flange 3, and the flange 3 is fixed as a lid of the pressure tank 4.

In FIG. 1, as a basic structure, a tank body 5 is formed which is obtained by welding a plurality of wall surface materials to each other to fix and seal them and which has a rectangular-parallelepiped box shape. Rod-like reinforcing members 10 are provided to the inner surface of the tank body 5, whereby the pressure tank 4 is formed. That is, the tank body 5 is a container formed by surrounding the periphery by a plurality of wall surface materials, welding them to each other to fix and seal them, and the reinforcing members 10 and the like are attached to the tank body 5, to enhance the strength thereof, thereby forming the pressure tank 4 which is one of components constituting the gas insulated switchgear.

<Structure of Pressure Tank>

Figure 2A:
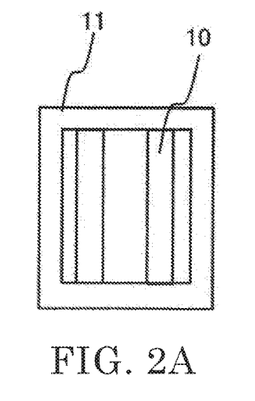
FIGS. 2A to 2D are projection views of a pressure tank of the gas insulated switchgear according to embodiment 1 of the present invention.
Figure 2B:
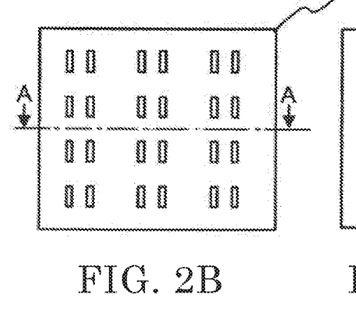
Figure 2C:
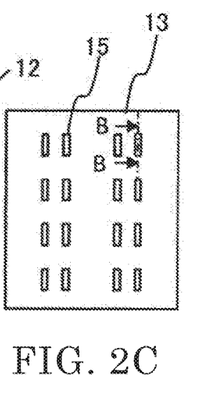
Figure 2D:
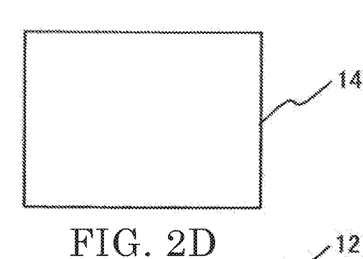

FIGS. 2A to 2D are projection views of the pressure tank 4. Specifically, FIG. 2A is a front view as seen from a direction in which the open/close portion composed of the vacuum valve 7 and the like is inserted into the tank and the tank is covered by the flange 3, and 11 denotes a wall surface material on the tank front-surface side. FIG. 2B is a side view of the tank, and 12 denotes a wall surface material on the tank side-surface side. FIG. 2C is a back view as seen from the back which is opposite to the tank front surface, and 13 denotes a wall surface material on the tank back-surface side. FIG. 2D is a plan view as seen from the top, and 14 denotes a wall surface material on the tank top-surface side. Although described in detail later, the wall surface material 12 on the tank side-surface side and the wall surface material 13 on the tank back-surface side each have a plurality of slit-shaped mortises 15 for attaching, inside the tank body 5, the reinforcing members 10 which are bent so as to have a U-shaped cross section in the present embodiment. It is noted that the reinforcing members 10 shown in FIG. 2A are the reinforcing members 10 attached, inside the tank body 5, to the wall surface material 13 on the tank back-surface side.

It is noted that the wall surface materials of the tank and the reinforcing members therefor are made from iron and stainless steel or aluminum and copper.

<Structure of Reinforcing Member>

Figure 3A:
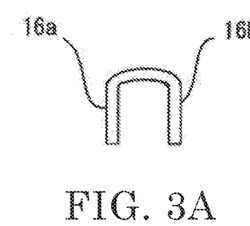
FIGS. 3A to 3C are projection views of a reinforcing member according to embodiment 1 of the present invention.
Figure 3B:
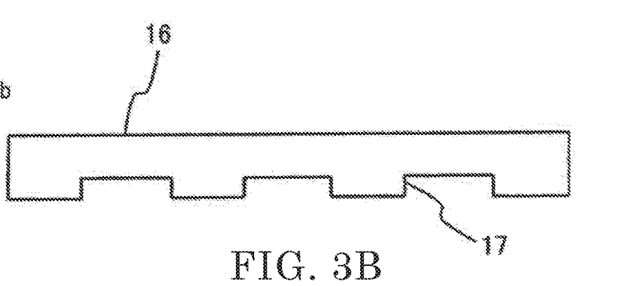
Figure 3C:
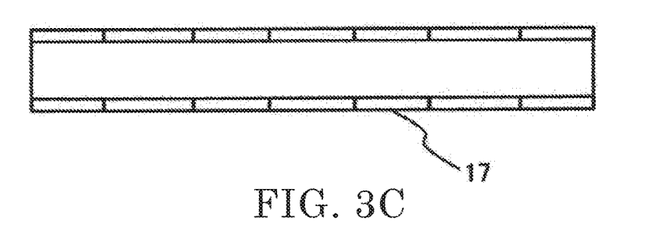

FIGS. 3A to 3C are projection views showing the configuration of a reinforcing member 16 bent so as to have a U-shaped cross section in the present embodiment. FIG. 3A shows the sectional shape of the reinforcing member 16. FIG. 3B shows the side shape of the reinforcing member 16. FIG. 3C shows the bottom shape of the reinforcing member 16 as seen from a direction in which tenon portions 17 extend. As described above, the reinforcing members 16 are used to be attached to the wall surface materials 12, 13 of the tank body 5 from inside, but FIGS. 3A to 3C show the shape of the reinforcing member 16 alone, which has not been attached to the wall surface material 12, 13 yet.

As shown in FIGS. 3A to 3C, the reinforcing member 16 in the present embodiment has a structure bent so as to have a U-shaped cross section. At the lower part in FIG. 3B, the tenon portions 17 are formed which are fitted to the slit-shaped mortises 15 formed in the wall surface material, thereby fixing the reinforcing member 16 to the wall surface material 12, 13. As shown in FIG. 3A, the tenon portions 17 are formed at the lower ends of both bent portions at the right surface and the left surface of the U-shaped cross section. In order that the tenon portions 17 formed at the lower ends of both bent portions at the right surface and the left surface are all inserted and fitted to the mortises 15 formed in the same wall surface material 12, 13, the tenon portions 17 at the right surface and the tenon portions 17 at the left surface of the reinforcing member 16 are formed so as to be directed in the same direction (downward direction in FIG. 3A, FIG. 3B).

<Attachment of Reinforcing Members>

Figure 4:
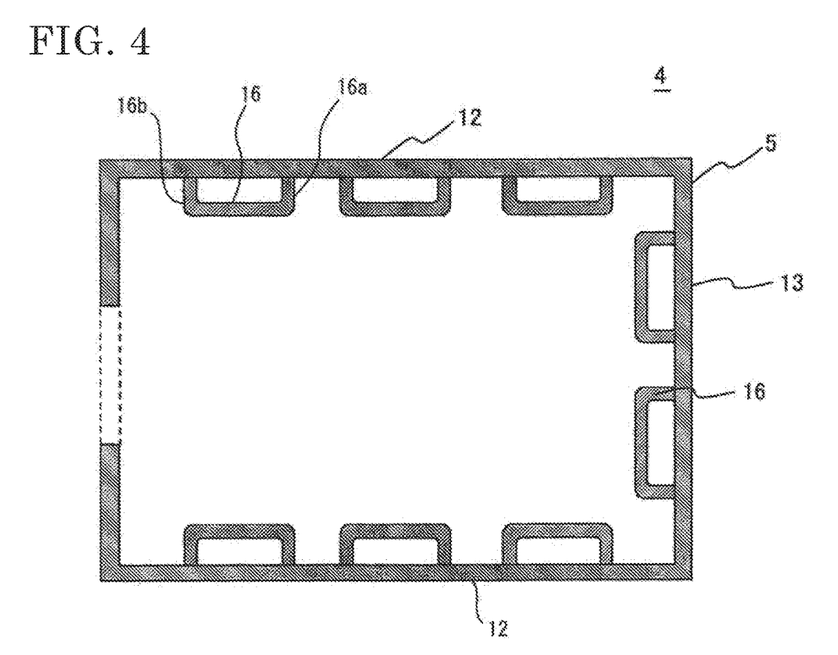
FIG. 4 is an A-A sectional view of the pressure tank shown in FIG. 2 in the present invention.
Figure 5A:
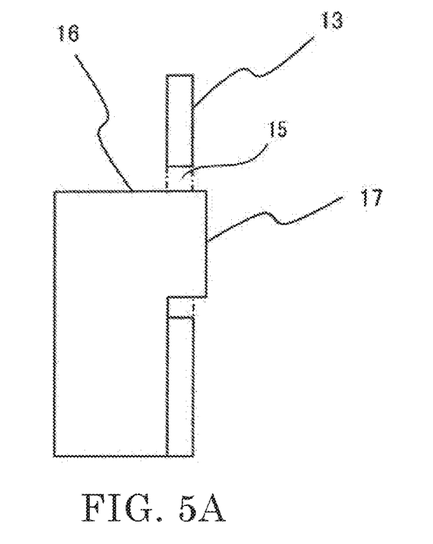
FIGS. 5A and 5B are B-B sectional views of the pressure tank shown in FIG. 2 in the present invention.
Figure 5B:
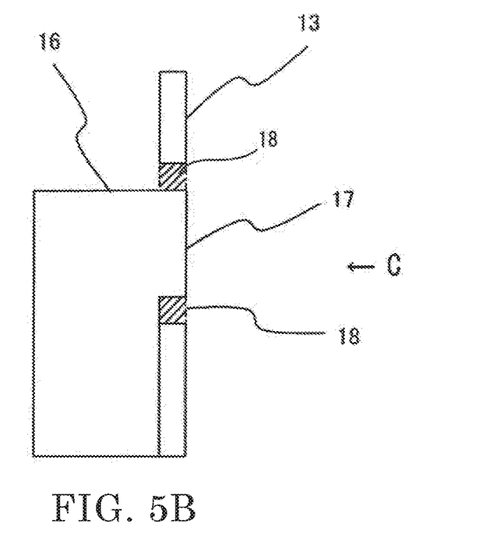

FIG. 4 is a plan sectional view as seen from an A-A direction in FIG. 2B, when the reinforcing members 16 are attached in the vertical direction inside the tank body 5 shown in FIGS. 2A to 2D. FIGS. 5A and 5B are sectional views as seen from a B-B direction in the tank body 5 shown in FIG. 2C.

As shown in FIG. 4, the reinforcing members 16 are attached to the wall surface materials 12, 13 of the side surfaces and the back surface inside the pressure tank 4. As described above, the tenon portions 17 of the reinforcing member 16 are formed, so as to be directed in the same direction, at the ends of bent portions on both sides of the reinforcing member 16 bent so as to have a U-shaped cross section. The tenon portions 17 formed at the right surface and the left surface of one reinforcing member 16 are all attached by being inserted and fitted to the plurality of mortises 15 formed in the same wall surface material 12, 13.

In the present embodiment, as shown in FIG. 4, two legs 16a, 16b forming the U shape of each U-shaped reinforcing member 16 are attached so as to be directed toward the wall surface material 12, 13, and the U-shaped bent portion of the reinforcing member 16 is directed toward the open/close portion which is a high-voltage charge portion. As a result, the U-shaped bent portion of the U-shaped reinforcing member 16 provides, owing to its round shape, an electric field relaxing effect with respect to the open/close portion which is a high-voltage charge portion, thereby improving withstand voltage performance between the open/close portion and the inner surface (including the U-shaped reinforcing members 16) of the pressure tank 4.

In the pressure tank 4, the upper end of the U-shaped reinforcing member 16 is located slightly lower than the upper end of the pressure tank 4, and the lower end of the U-shaped reinforcing member 16 is located slightly higher than the lower end of the pressure tank 4. As a result, in the pressure tank, it is necessary to improve the withstand voltage performance between the open/close portion which is a high-voltage charge portion and the inner side of the pressure tank 4 which is a ground portion, but since the U-shaped reinforcing member 16 is attached with its U-shaped bent portion directed toward the open/close portion, the electric field between the open/close portion and the inner surface portion (including the U-shaped reinforcing members 16) of the pressure tank 4 which is a ground portion can be relaxed, whereby the withstand voltage performance can be improved. As a result, it becomes possible to downsize the pressure tank 4. In addition, since the upper end and the lower end of the U-shaped reinforcing member 16 are located away from the upper end and the lower end of the pressure tank 4 by a predetermined distance, the U-shaped reinforcing member 16 forms, in the pressure tank 4, a ventilation duct between the upper end and the lower end of the pressure tank 4. Therefore, although the temperature in the sealed pressure tank 4 greatly increases due to current application in the open/close portion, since the U-shaped reinforcing member 16 is attached along the up-down direction while having close contact with the wall surface material 12, 13, the sealed gas flows inside the U-shaped reinforcing member 16 by a convection phenomenon toward the upper side of the pressure tank 4. At this time, the gas flows in contact with the wall surface material 12, 13 so that heat in the pressure tank 4 can be efficiently dissipated to outside of the pressure tank 4.

In FIG. 5A, the tenon portion 17 is inserted into the mortise 15 but has not been fixed by welding or the like yet. In FIG. 5B, an end portion, of the tenon portion 17, that protrudes from the wall surface material 13 is melted and welded so that the tenon portion 17 is fixed. As shown in detail in FIG. 5A, the mortise 15 is formed to be slightly larger than the tenon portion 17 so that a slight gap is formed between the mortise 15 and the tenon portion 17. In addition, the tenon portion 17 is formed to be slightly higher than the thickness of the wall surface material 13 in which the mortise 15 is formed. That is, as shown in FIG. 5A, at a stage before welding, when the tenon portion 17 is fitted to the mortise 15, a gap is formed around the tenon portion 17, and the tenon portion 17 slightly protrudes outward from the outer surface of the wall surface material.

The protrusion height is set so that the height of the tenon portion 17 becomes substantially the same height as the outer surface of the wall surface material 13 when the tenon portion 17 is melted by welding and the melted part thereof fills the gap between the mortise 15 and the tenon portion.

Figure 6A:
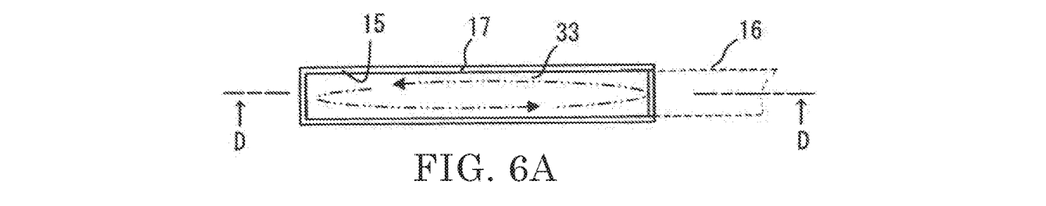
FIGS. 6A and 6B are views illustrating a welding method according to embodiment 1 of the present invention.
Figure 6B:
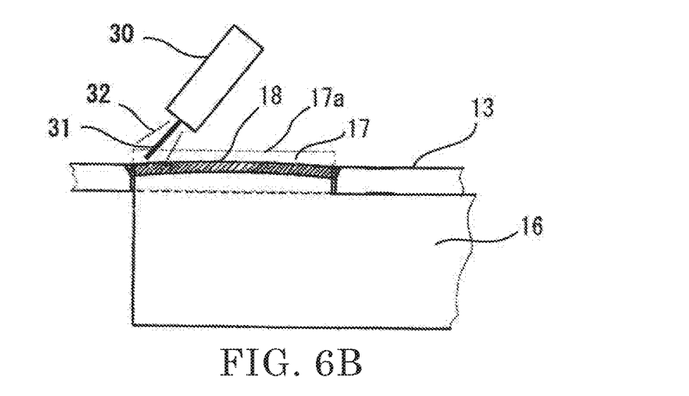

Next, the welding method will be described with reference to FIGS. 6A and 6B. FIG. 6A is a view of the mortise 15 as seen from the right in FIG. 5B, i.e., C direction. FIG. 6B is a sectional view as seen from a D-D direction in FIG. 6A. In FIG. 6A, the tenon portion 17 is inserted to inside of the mortise 15 with a predetermined gap therebetween. FIG. 6B shows the method for welding the engagement part between the mortise 15 and the tenon portion 17. In the present embodiment, an example using TIG welding is shown. 30 denotes a welding torch for TIG welding, 31 denotes a tungsten electrode of the welding torch 30, 32 denotes an inert gas such as argon or helium jetted from the welding torch 30 toward the welding portion. In order to melt the tenon portion 17 uniformly in the mortise 15, the welding torch is operated in an elliptic shape as indicated by an operation route 33 in FIG. 6A. In this way, from the state of a tenon portion 17a before welding, the end of the tenon portion 17 is melted uniformly in the slit-shaped mortise 15, to fill the gap in the mortise 15.

Thus, the end portion of the tenon portion 17 or the wall surface of the mortise 15 is melted by TIG welding, whereby the gap between the mortise 15 and the tenon portion 17 can be filled in a sealed state by the melted material and the U-shaped reinforcing member 16 can be firmly fixed to the wall surface material 13. It is noted that, if the volume of a part, of the tenon portion 17, that protrudes from an end surface of the wall surface material 13 is designed to be the same as the volume of the melted part (i.e., welding portion 18) in the gap between the mortise 15 and the tenon portion 17, a recess of the mortise 15 formed in the wall surface material 13 disappears after welding, and thus the mortise 15 part can be made flush with the other surface of the wall surface material 13. Thus, by making the mortise 15 part flush with the other surface of the wall surface material 13, an effect of improving the strength of the joining part is obtained. In addition, an effect of preventing deterioration in the appearance of the outer surface of the pressure tank 4 is obtained.

In TIG welding, only a welding target (in the present embodiment, the wall surfaces of the tenon portion 17 and the mortise 15) is melted by an arc from the tungsten electrode 31, and therefore, since a welding material is not supplied from outside, the melting amount in welding can be easily grasped. Therefore, the gap of the mortise 15 and the height of the tenon portion 17 can be easily designed, whereby it becomes possible to easily make the welding finished surface of the mortise 15 part flush with the surface of the wall surface material 12, 13, as compared to the other welding methods.

As described above, it is preferable that the height of the tenon portion 17 is greater than the thickness of the wall surface material 12, 13 as described above, and it is preferable that it is possible to, by melting, fill the gap between the mortise 15 and the tenon portion 17 and make the surface of the pressure tank 4 flat. In addition, the magnitude relationship between the tenon portion 17 and the mortise 15 needs to be a magnitude relationship that allows the tenon portion 17 to be inserted and fitted into the mortise 15 and thereafter, by melting the end of the tenon portion 17, allows the gap between the mortise 15 and the tenon portion 17 to be filled to form the welding portion 18 so that they are fixed.

In the present embodiment, the height of the tenon portion 17 is greater than the thickness of the wall surface material by 0.3 mm, but is not limited thereto. For example, by making the height of the tenon portion 17 greater by 0.05 mm to 0.5 mm, the same effect as in the present embodiment can be obtained. In addition, even in the case of making the height of the tenon portion 17 greater by 0.5 mm to 1 mm, the same effect can be obtained though the working time is slightly prolonged.

In the present embodiment, the dimensions of the mortise 15 in the longitudinal direction and the lateral direction are both greater than those of the tenon portion 17 by 0.3 mm, but are not limited thereto. For example, even in the case of making the dimensions of the mortise 15 in the longitudinal direction and the lateral direction greater by 0.05 mm to 0.5 mm, the same effect as in the present embodiment can be obtained. Even in the case of making these dimensions of the mortise 15 greater by 0.5 mm to 1 mm, the same effect can be obtained though the working time is slightly prolonged.

In the present embodiment, the reinforcing members 16 bent so as to have a U-shaped cross section are fixed to the inner sides of the wall surface materials 12, 13 of the tank body 5, whereby the strength of the pressure tank 4 can be greatly enhanced. Since each reinforcing member 16 is bent so as to have a U-shaped cross section and has the tenon portions 17 directed in the same direction, the strength of the pressure tank 4 can be enhanced without limiting the size and the configuration of the open/close portion stored in the tank body 5 as in the case where, for example, the tenon portions 17 are provided at two opposed sides at both ends of a reinforcing member having a plate-shaped cross section and the reinforcing member is fixed so as to stride between the two opposed wall surface materials.

Further, in the present embodiment, the mortises 15 are formed in the wall surface materials 12, 13 of the tank body 5 forming the pressure tank 4, and the tenon portions 17 formed on each reinforcing member 16 are inserted and fitted thereto from inside of the tank body 5, whereby the welding work can be performed from outside of the tank body 5. Thus, it becomes unnecessary to clean spatter after welding, in the pressure tank 4, and the welding work itself is also facilitated.

In the case of performing welding from inside of the pressure tank 4, the material melted at a high temperature is rapidly cooled at a part where the welding has been completed, so that distortion occurs in a direction in which the welding work surface is dented. However, in the present embodiment, since welding is performed from outside of the pressure tank 4, such distortion can be reduced, and the time taken to remove the distortion after welding of the pressure tank 4 can be shortened.

Such a reinforcement structure using the reinforcing member 16 in the pressure tank 4 allows the number, the size, the attachment interval, and the like of the reinforcing members to be adjusted in accordance with the size of a device placed in the pressure tank 4, the pressure of a gas to fill the pressure tank 4, the electric field intensity in the pressure tank 4, and the like. The mortise 15 is not limited to a rectangle shape, but may be, for example, a hole having a shape such as square, ellipse, or polygon having three or more sides, or a special shape such as L shape or V shape.

Embodiment 2

In the present embodiment, only the shape of the reinforcing member is different as compared to embodiment 1, and the other structures, working conditions, and the like are the same.

Figure 7A:
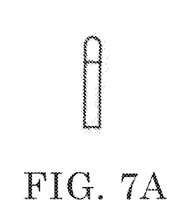
FIGS. 7A to 7C are projection views of a reinforcing member of a pressure tank according to embodiment 2 of the present invention.
Figure 7B:
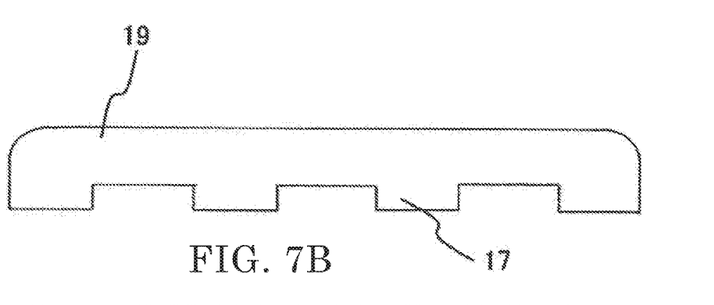
Figure 7C:
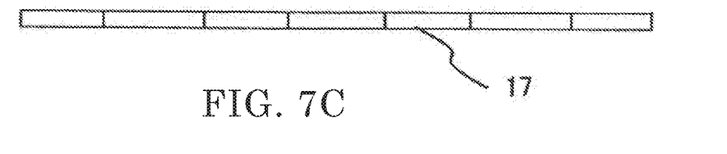

FIGS. 7A to 7C show projection views of a reinforcing member 19 having a plate-shaped cross section in the present embodiment. FIG. 7A shows the sectional shape of the reinforcing member 19, and FIG. 7B and FIG. 7C show the side shape and the bottom shape thereof, respectively. The present embodiment is different from embodiment 1 in that, in embodiment 1, the reinforcing member is bent in a U shape and has tenon portions 17 directed in the same direction at both ends of the U shape, whereas in the present embodiment, the tenon portions 17 are formed at one end of the plate-shaped reinforcing member 19.

In addition, the plate-shaped reinforcing member 19 has a round shape at corner portions at an end on a side opposite to the tenon portions 17. Therefore, an electric field relaxing effect is provided with respect to the open/close portion which is a high-voltage charge portion, and the withstand voltage performance between the open/close portion and the inner surface (including the reinforcing members 19) of the pressure tank 4 can be improved.

Also in the present embodiment, by performing welding from outside of the pressure tank 4, the welding process can be simplified, spatter cleaning after welding becomes easy, and the distortion removing process after welding can be shortened, for example. Thus, the same effects as in embodiment 1 can be obtained.

Embodiment 3

In the present embodiment, only the shape of the reinforcing member is different as compared to embodiments 1 and 2, and the other structures, working conditions, and the like are the same.

Figure 8A:
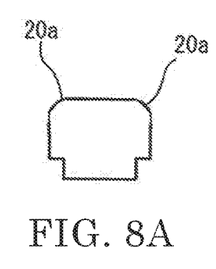
FIGS. 8A to 8C are projection views of a reinforcing member of a pressure tank according to embodiment 3 of the present invention.
Figure 8B:
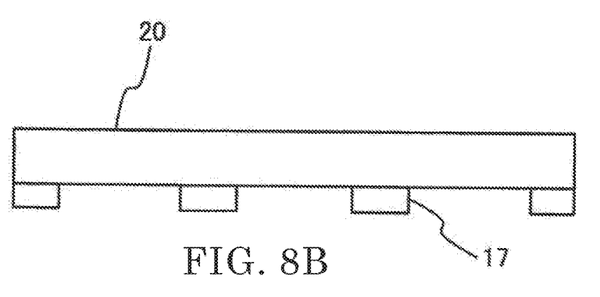
Figure 8C:
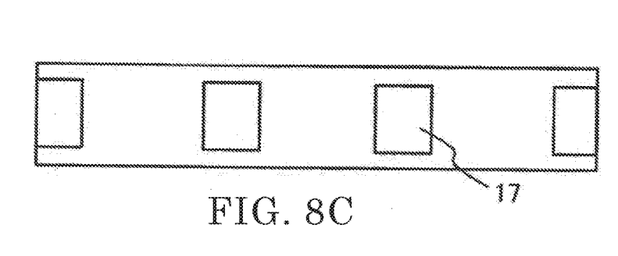

FIGS. 8A to 8C show projection views of a reinforcing member 20 having substantially a quadrangle rod shape in the present embodiment. FIG. 8A shows the sectional shape of the reinforcing member 20, and FIG. 8B and FIG. 8C show the side shape and the bottom shape thereof, respectively. The present embodiment is different from embodiment 1 in that, in embodiment 1, the reinforcing member is bent in a U shape and has tenon portions 17 directed in the same direction at both ends of the U shape, whereas in the present embodiment, tenon portions 17 having substantially a quadrangle block shape are formed on one surface of the reinforcing member 20 having substantially a quadrangle rod shape, and corner portions thereof on a side opposite to the tenon portions 17 are rounded to form electric field relaxation portions 20a. Since the electric field relaxation portions 20a are located so as to be directed toward the open/close portion which is a high-voltage charge portion, the withstand voltage performance between the open/close portion and the inner surface of the pressure tank 4 can be improved owing to the electric field relaxing effect by the rounded electric field relaxation portions 20a.

Figures 9A, 9C:
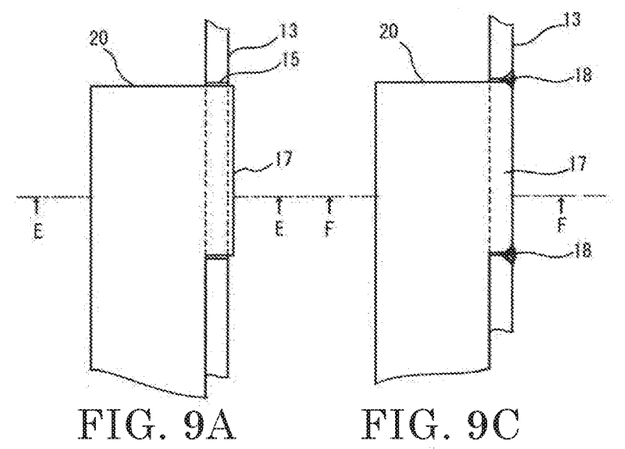
FIGS. 9A to 9D are views showing welding parts in FIG. 8.
Figure 9B:
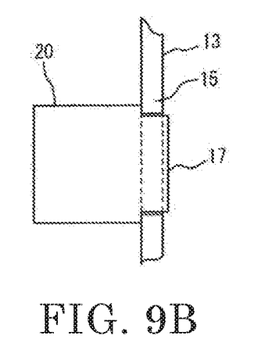
Figure 9D:
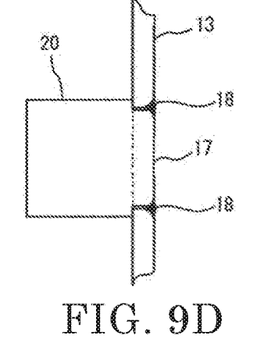

Next, the welding structure in the present embodiment will be described with reference to FIGS. 9A to 9D. FIG. 9A and FIG. 9B show the mortise 15 and the tenon portion 17 combined with each other before welding. FIG. 9A is a side sectional view showing a state in which the tenon portion 17 penetrates through the mortise 15 to be coupled therewith. FIG. 9B is a sectional view (E-E sectional view) of the mortise 15 and the tenon portion 17 coupled with each other in FIG. 9A, as seen from the axial direction of the reinforcing member 20. FIG. 9C and FIG. 9D show the mortise 15 and the tenon portion 17 combined with each other after welding, and respectively correspond to FIG. 9A and FIG. 9B. FIG. 9D is a view showing an F-F cross section in FIG. 9C. In FIG. 9C and FIG. 9D, 18 denotes a welding portion formed by the inner wall of the mortise 15 and the tenon portion 17 being melted by welding.

It is noted that the above-described tenon portions 17 having a quadrangle block shape are not limited to a quadrangle shape, but may have a cylindrical block shape.

Also in the present embodiment, by performing welding from outside, the welding process can be simplified, spatter cleaning after welding becomes easy, and the distortion removing process after welding can be shortened, for example. Thus, the same effects as in embodiment 1 can be obtained.

Embodiment 4

In the present embodiment, only the shape of the reinforcing member is different as compared to embodiments 1 to 3, and the other structures, working conditions, and the like are the same.

Figure 10A:
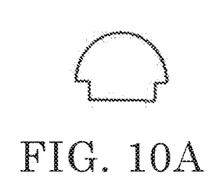
FIGS. 10A to 10C are projection views of a reinforcing member of a pressure tank according to embodiment 4 of the present invention.
Figure 10B:
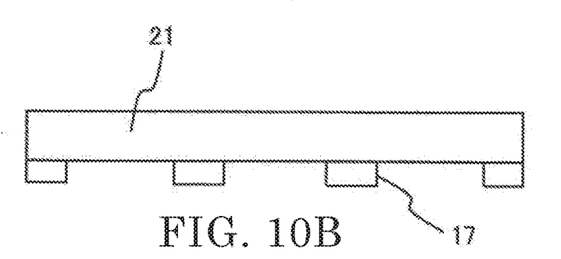
Figure 10C:
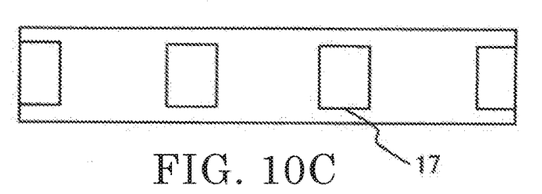

FIGS. 10A to 10C show projection views of a rod-shaped reinforcing member 21 having a mountain-shaped cross section in the present embodiment. FIG. 10A shows the sectional shape of the reinforcing member 21, and FIG. 10B and FIG. 10C show the side shape and the bottom shape thereof, respectively. The present embodiment is different from embodiment 1 in that, in embodiment 1, the reinforcing member is bent in a U shape and has tenon portions 17 directed in the same direction at both ends of the U shape, whereas in the present embodiment, tenon portions 17 having a quadrangle block shape are formed on one bottom surface of the rod-shaped reinforcing member 21 having a mountain-shaped cross section.

It is noted that the tenon portions 17 having a quadrangle block shape are not limited to a quadrangle shape, but may be a cylindrical block shape.

Also in the present embodiment, by performing welding from outside, the welding process can be simplified, spatter cleaning after welding becomes easy, and the distortion removing process after welding can be shortened, for example. Thus, the same effects as in embodiment 1 can be obtained.

Embodiment 5

In the present embodiment, the feature of the shape of the welding portion 18 will be described.

Figure 11A:
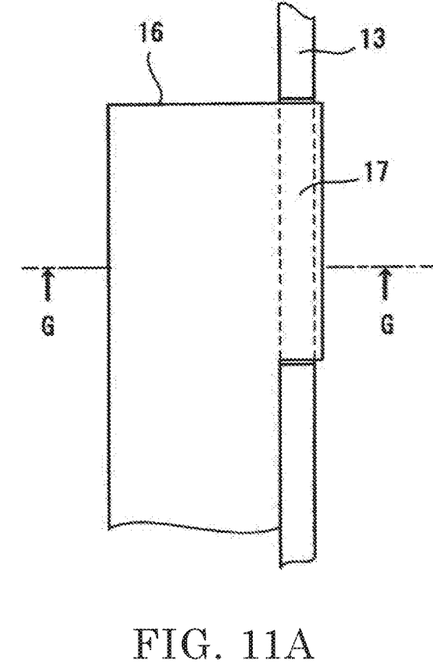
FIGS. 11A to 11D are views showing welding parts of a reinforcing member of a pressure tank according to embodiment 5 of the present invention.
Figure 11B:
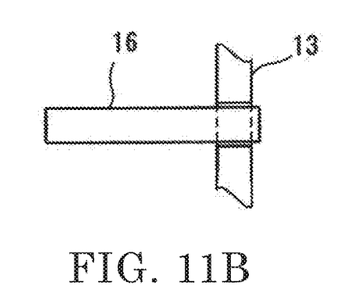
Figure 11C:
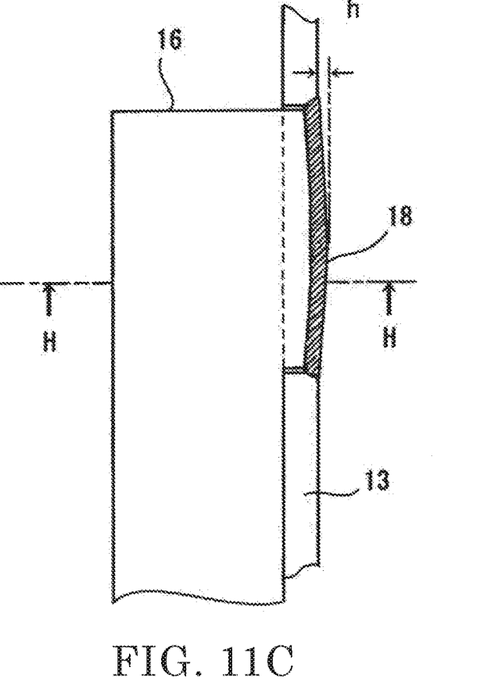
Figure 11D:
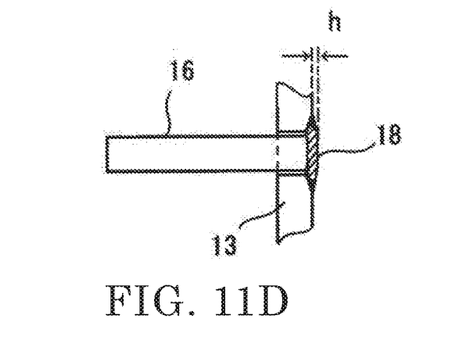

As shown in FIGS. 11A to 11D, the welding portion in the present embodiment 5 is formed such that the welding portion 18 bulges in a dome shape from the surface of the wall surface material 13. FIG. 11A corresponds to FIG. 5A in embodiment 1 and shows the mortise 15 and the tenon portion 17 coupled with each other before welding. FIG. 11B is a view showing a G-G cross section in FIG. 11A. FIG. 11C corresponds to FIG. 5C in embodiment 1 and shows the mortise 15 and the tenon portion 17 welded with each other after welding. FIG. 11D is a view showing an H-H cross section in FIG. 11C. In the drawings, 18 denotes the welding portion 18 bulging in a dome shape by a height of h from the surface part of the wall surface material 13.

Such a shape provides an effect of improving the joining strength between the wall surface material 13 and the U-shaped reinforcing member, though the appearance is slightly deteriorated.

Embodiment 6

In the present embodiment, the feature of the shape of the welding portion 18 different from embodiment 5 will be described.

Figure 12A:
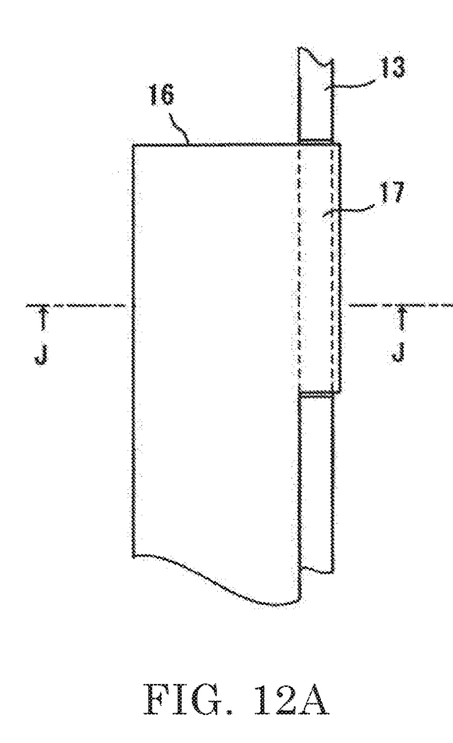
FIGS. 12A to 12D are views showing welding parts of a reinforcing member of a pressure tank according to embodiment 6 of the present invention.
Figure 12B:
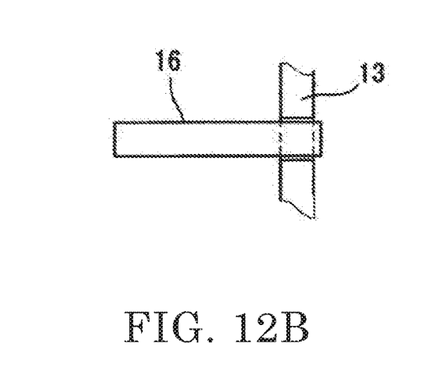
Figure 12C:
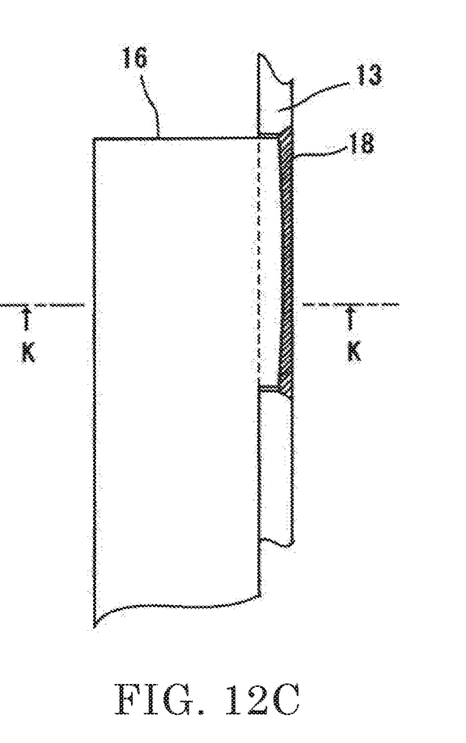
Figure 12D:
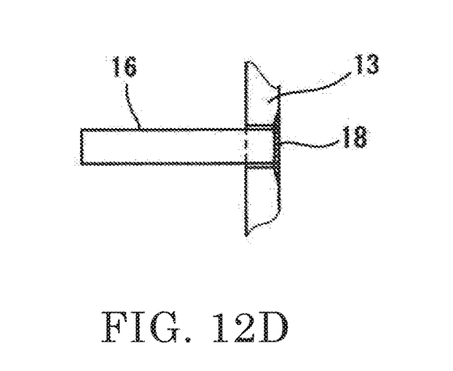

As shown in FIGS. 12A to 12D, the welding portion in the present embodiment 6 is formed such that the welding portion 18 is flush with the surface of the wall surface material 13. FIG. 12A corresponds to FIG. 5A in embodiment 1 and shows the mortise 15 and the tenon portion 17 coupled with each other before welding. FIG. 12B is a view showing a J-J cross section in FIG. 12A. FIG. 12C corresponds to FIG. 5C in embodiment 1 and shows the mortise 15 and the tenon portion 17 welded with each other after welding. FIG. 12D is a view showing a K-K cross section in FIG. 12C. In the drawings, 18 denotes the welding portion 18 formed to be flush with the surface part of the wall surface material 13.

Such a shape provides an effect of improving the joining strength between the wall surface material 13 and the U-shaped reinforcing member and achieving an excellent appearance.

Embodiment 7

In the present embodiment, the feature of the shape of the welding portion 18 further different from embodiment 5 will be described.

Figure 13A:
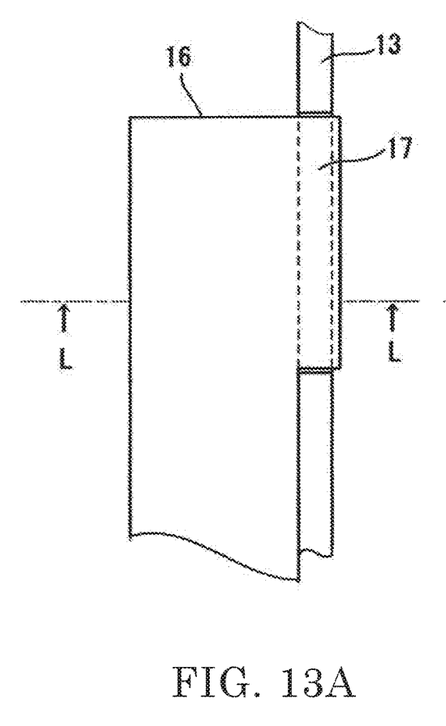
FIGS. 13A to 13D are views showing welding parts of a reinforcing member of a pressure tank according to embodiment 7 of the present invention.
Figure 13B:
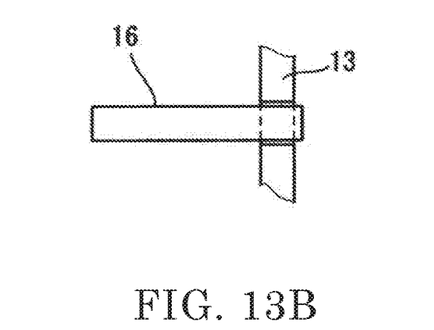
Figure 13C:
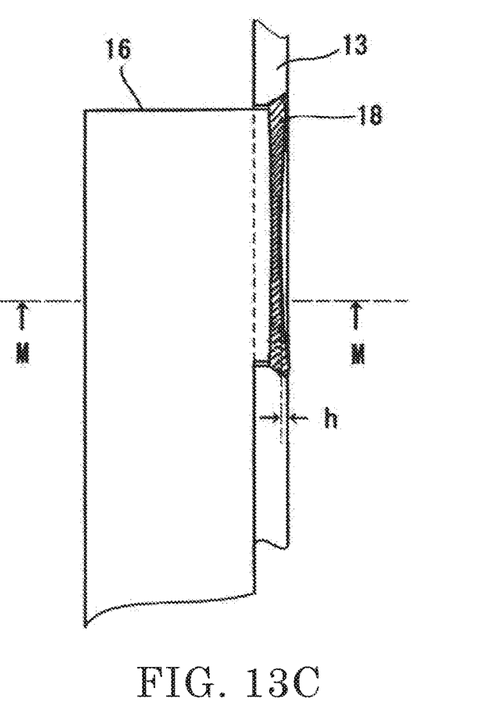
Figure 13D:
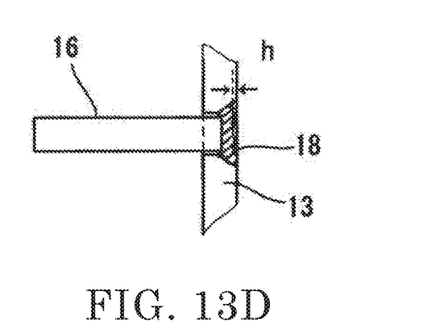

As shown in FIGS. 13A to 13D, the welding portion in the present embodiment 7 is formed such that the welding portion 18 is recessed from the surface of the wall surface material 13. FIG. 13A corresponds to FIG. 5A in embodiment 1 and shows the mortise 15 and the tenon portion 17 coupled with each other before welding. FIG. 13B is a view showing an L-L cross section in FIG. 13A. FIG. 13C corresponds to FIG. 5C in embodiment 1 and shows the mortise 15 and the tenon portion 17 welded with each other after welding. FIG. 13D is a view showing an M-M cross section in FIG. 13C. In the drawings, 18 denotes the welding portion 18 recessed in a reverse dome shape by a depth of h from the surface part of the wall surface material 13.

Such a shape provides an effect of improving the joining strength between the wall surface material 13 and the U-shaped reinforcing member and enabling a plurality of pressure tanks 4 to be arranged in close contact with each other, though the appearance is slightly deteriorated.

Embodiment 8

In the present embodiment, the reinforcement structure of the pressure tank further advanced from embodiment 1 will be described.

Figure 14:
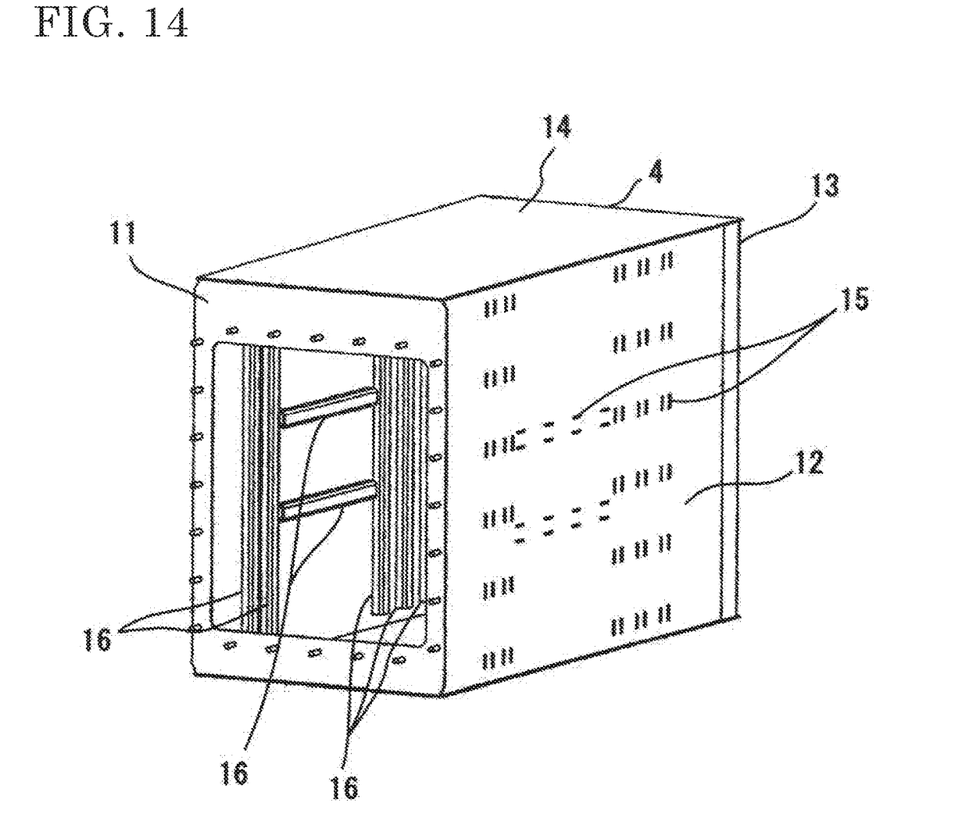
FIG. 14 is a perspective view showing a pressure tank according to embodiment 8 of the present invention.
Figure 15A:
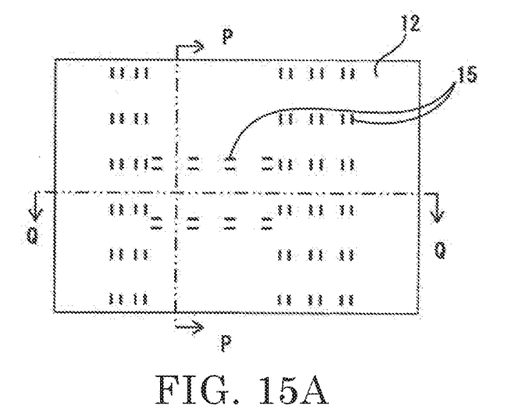
FIGS. 15A to 15C are views showing the pressure tank in FIG. 14.
Figure 15B:
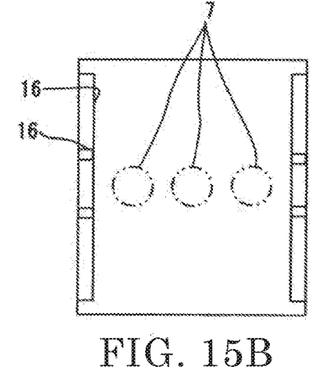
Figure 15C:
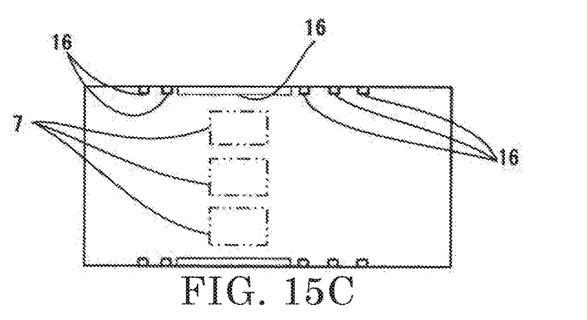

As shown in FIG. 14 and FIGS. 15A to 15C, in the pressure tank in the present embodiment 8, the U-shaped reinforcing members 16 are attached so as to be perpendicular to each other. FIG. 14 is a perspective view of the pressure tank 4 as seen from the obliquely front side. FIG. 15A is a side view of the pressure tank in FIG. 14. FIG. 15B is a front sectional view as seen from a P-P direction in FIG. 15A. FIG. 15C is a plan sectional view as seen from a Q-Q direction in FIG. 15A. In the drawings, in the vertical direction, two U-shaped reinforcing members 16 are provided on the front side and three U-shaped reinforcing members 16 are provided on the back side such that they are parallel to each other, and in the horizontal direction, two upper and lower U-shaped reinforcing members 16 are provided, between the front-side two members and the rear-side three members in the vertical direction, so as to be directed in the horizontal direction.

Such a configuration provides an effect of improving the strength of the wall surface materials 12, 13 against bending loads thereon in the horizontal direction and the vertical direction, in the example shown in FIG. 14 and FIGS. 15A to 15C.

An area where the electric field intensity is severe between the open/close portion and the pressure tank inner surface (ground portion) is an area between each vacuum valve 7 and the inner surface of the pressure tank 4. On the lateral sides of the vacuum valves 7, the U-shaped reinforcing members 16 in the vertical direction are not provided but the U-shaped reinforcing members 16 in the horizontal direction are provided along the axial direction of the vacuum valves 7, whereby the electric field intensity can be relaxed between the open/close portion and the pressure tank inner surface (ground portion). As a result, an effect of enabling downsizing of the pressure tank 4 is obtained.

It is noted that, within the scope of the present invention, each of the above embodiments may be modified or simplified as appropriate.

DESCRIPTION OF THE REFERENCE CHARACTERS 1 spring operation device
2a operation spring
2b contact pressure spring
3 flange
4 pressure tank
5 tank body
6 insulation rod
7 vacuum valve
7a electrode
8 fixed terminal
9 insulation holder
10 reinforcing member
11 wall surface material on tank front-surface side
12 wall surface material on tank side-surface side
13 wall surface material on tank back-surface side
14 wall surface material on tank top-surface side
15 mortise
16 reinforcing member
16a, 16b leg
17 tenon portion
17a tenon portion before welding
18 welding portion
19 reinforcing member
20 reinforcing member
20a electric field relaxation portion
21 reinforcing member
30 welding torch
31 tungsten electrode
32 welding gas
33 operation route

The invention claimed is:

1. A pressure tank comprising:
a tank body having a plurality of penetrating mortises formed in a row, and having a space formed inside the tank body;
a U-shaped reinforcing member having
a plurality of tenon portions formed, in a row, at an end thereof so as to be directed in one direction,
an electric field relaxation portion formed on a side opposite to the tenon portions, and
a plurality of contact portions formed at least between the plurality of tenon portions and being in contact with an inner wall surface of the tank body,
the U-shaped reinforcing member being fitted such that each tenon portion is inserted into the corresponding mortise and the plurality of contact portions are in contact with the inner wall surface of the tank body while an end of the tenon portion protrudes from an outer wall surface of the tank body;
a welding portion sealing and fixing each mortise and a corresponding tenon portion with no gap therebetween, the welding portion being formed by melting, in the mortise, the tenon portion from outside of the tank body.

2. The pressure tank according to claim 1, wherein each of the plurality of mortises has a slit shape.

3. The pressure tank according to claim 1, wherein the welding portion is formed by melting and joining only each tenon portion and a wall surface of the corresponding mortise.

4. A gas insulated switchgear comprising:
the pressure tank according to claim 1;
an open/close portion stored inside the pressure tank; and
an operation device for causing the open/close portion to operate.

5. The pressure tank according to claim 1, wherein a protrusion height of the end of the tenon portion protruding from the outer wall surface of the tank body before welding is set so as to be substantially the same height as the outer wall surface of the tank body when the welding portion is formed.

6. The pressure tank according to claim 1, wherein a protrusion height of the end of the tenon portion protruding from the outer wall surface of the tank body before welding is set so as to bulge in a dome shape from a surface of the outer wall surface of the tank body when the welding portion is formed.

7. The pressure tank according to claim 1, wherein a protrusion height of the end of the tenon portion protruding from the outer wall surface of the tank body before welding is set so as to be recessed from a surface of the outer wall surface of the tank body when the welding portion is formed.

8. A gas insulated switchgear comprising:
an open/close portion stored inside a pressure tank; and
an operation device for causing the open/close portion to operate,
wherein the pressure tank includes:
a tank body having a plurality of penetrating mortises formed in a row and having a space formed inside the tank body;
a U-shaped reinforcing member having
a plurality of tenon portions formed, in a row, at an end thereof so as to be directed in one direction,
an electric field relaxation portion formed on a side opposite to the tenon portions so as to be directed toward the open/close portion, and
a plurality of contact portions formed at least between the plurality of tenon portions and being in contact with an inner wall surface of the tank body,
the U-shaped reinforcing member being attached such that each tenon portion is inserted into a corresponding mortise and the plurality of contact portions are in contact with the inner wall surface of the tank body; and
a welding portion sealing and fixing each mortise and the corresponding tenon portion with no gap therebetween, the welding portion being formed by inserting the tenon portion of the U-shaped reinforcing member into the mortise of the tank body and melting an end of the tenon portion from outside of the tank body.

9. The gas insulated switchgear according to claim 8, comprising:

a plurality of U-shaped reinforcing members, the U-shaped reinforcing members are arranged at an inner surface of the pressure tank so as to be directed in a vertical direction and a horizontal direction.

10. The gas insulated switchgear according to claim 9, wherein the open/close portion includes a vacuum valve, and of the plurality of U-shaped reinforcing members, a reinforcing member provided so as to be directed in the horizontal direction is arranged along an axial direction of the vacuum valve.

11. A pressure tank manufacturing method comprising:

a step of forming, in a row, a plurality of penetrating mortises in a tank body having a space formed inside the tank body;

a step of attaching a U-shaped reinforcing member inside the tank body, the U-shaped reinforcing member having a plurality of tenon portions which are higher than a thickness of the tank body and are formed, in a row, at an end of the U-shaped reinforcing member so as to be directed in one direction, the U-shaped reinforcing member having an electric field relaxation portion on a side opposite to the tenon portions, the U-shaped reinforcing member further having a plurality of contact portions which are formed at least between the plurality of tenon portions and are in contact with an inner wall surface of the tank body, the U-shaped reinforcing member being attached with the tenon portion inserted into the mortise; and a step of melting, from outside of the tank body, an end of each tenon portion protruding from an outer surface of the tank body, to seal a gap between the tenon portion and a corresponding mortise, thereby forming a welding portion.

12. The pressure tank manufacturing method according to claim 11, wherein each of the plurality of mortises has a slit shape.

13. The pressure tank manufacturing method according to claim 11, wherein in formation of the welding portion, TIG welding is used.

* * * * *